Sept. 11, 1973    J. L. MARGRAVE ET AL    3,758,450
PROCESS FOR THE PRODUCTION OF HYDROLYTICALLY
RESISTANT FLUOROCARBONS
Filed April 14, 1971
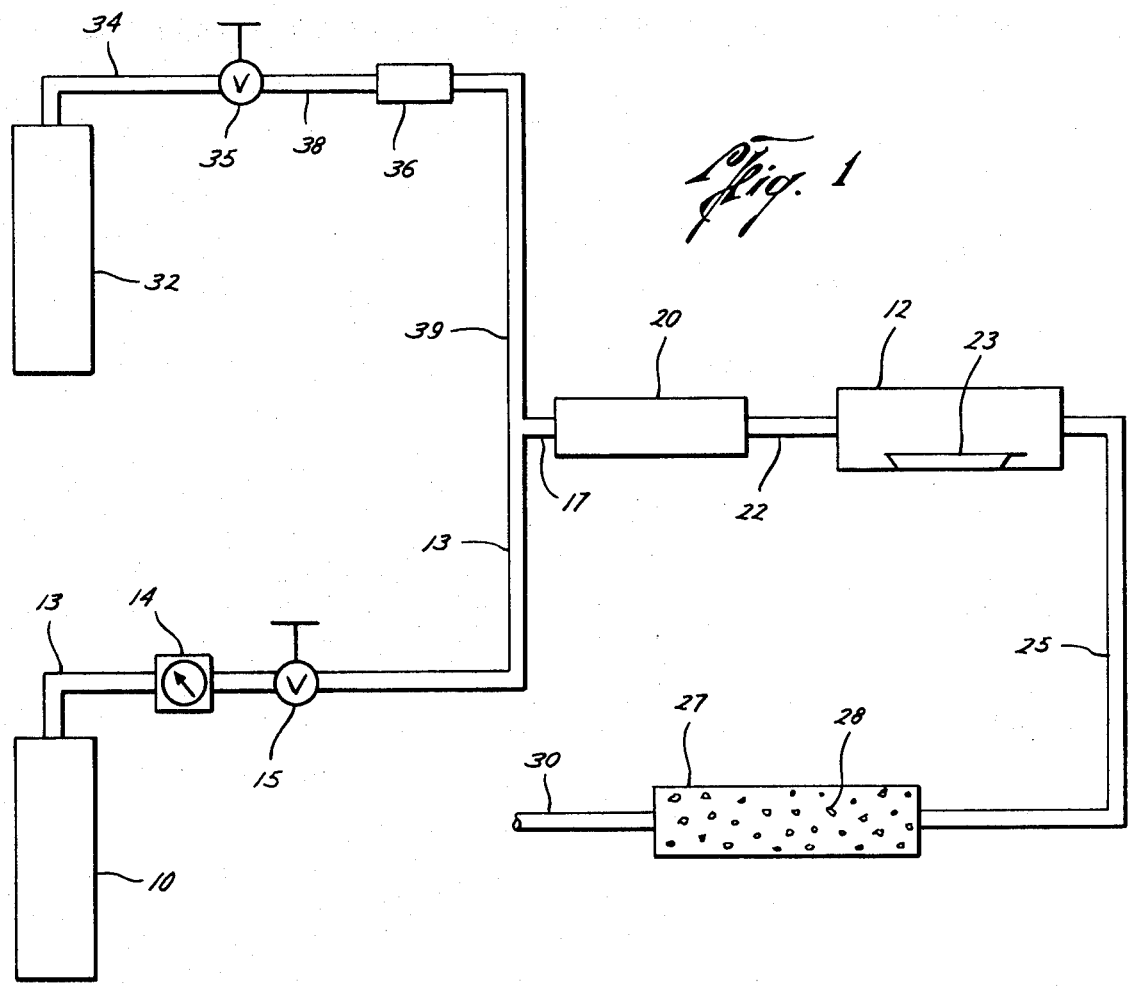
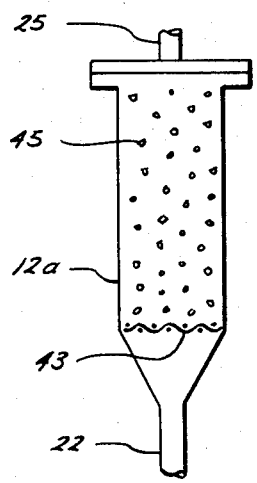
John L. Margrave
Richard J. Lagow
INVENTORS
BY Larry B. Feldkamp
ATTORNEY United States Patent Office 3,758,450
Patented Sept. 11, 1973

3,758,450
PROCESS FOR THE PRODUCTION OF HYDRO-
LYTICALLY RESISTANT FLUOROCARBONS
John L. Margrave, Houston, Tex., and Richard J. Lagow,
Cambridge, Mass., assignors to R. I. Patents, Inc.,
Houston, Tex.
Continuation-in-part of abandoned application Ser. No.
718,128, Apr. 2, 1968. This application Apr. 14, 1971,
Ser. No. 133,865
Int. Cl. C08f 27/03
U.S. Cl. 260—94.9 H        25 Claims

ABSTRACT OF THE DISCLOSURE

A process for the treatment of fluorinated aliphatic and aromatic hydrocarbons, so as to produce hydrolytically resistant fluorocarbons which are color and thermally stable. The production of hydrolytically resistant fluorocarbons involves the elimination of easily hydrolyzable groups—fluorine atoms or $CF_3$ groups attached to tertiary carbon atoms. By treating fluorinated aliphatic and aromatic materials with a basic solution, preferably at a temperature above 50° C., these hydrolyzable groups are replaced by hydroxyl groups. After washing with water, the hydrolyzed materials are then placed in a reaction chamber and refluorinated to produce fluorocarbons without any hydroxyl groups or any easily hydrolyzable sites. In the refluorination of the hydrolyzed materials, fluorine gas or an inorganic fluoride gas is introduced into the atmosphere surrounding the hydrolyzed materials at a slow rate such that the initial concentration of the fluorinating gas is a mere trace and such concentration is less than 6% at the end of 30 minutes of fluorination. The introduction of the fluorinating gas is then continued at a slow rate to gradually increase the concentration thereof in said atmosphere until the concentration of the fluorinating gas is about 100%. The fluorination process is preferably conducted at atmospheric pressure and room temperature; however, higher temperatures up to the decomposition temperature of the material may be used. Aliphatic and aromatic compounds may also be initially fluorinated by the direct action of a fluorinating gas as outlined above, and then treated with a basic solution and refluorinated to eliminate easily hydrolyzable groups.

CROSS-REFERENCES TO RELATED APPLICATIONS

This application is a continuation-in-part of copending application Ser. No. 718,128, filed Apr. 2, 1968, which application (but not the invention thereof) has been abandoned.

BACKGROUND OF THE INVENTION (1) Field of the invention

This invention relates to a process for the production of hydrolytically resistant fluorocarbons by the elimination of easily hydrolyzable groups from fluoroinated aliphatic and aromatic hydrocarbons, thereby producing fluorinated materials with improved color and thermal stability. More particularly, it relates to increasing the hydrolytic resistance of fluorinated polymeric aliphatic or aromatic materials. In one aspect of this invention, previously unfluorinated aliphatic and aromatic hydrocarbons can be directly fluorinated and then treated to improve the hydrolytic resistance of the fluorocarbon products.

(2) Prior art

It is so widely recognized that it is not a trivial matter to control the reactions of elemental fluourine that, in the synthesis of fluorocarbons and other fluorides, it has been the general practice to avoid the use of elemental fluorine as a fluorinating agent. A very diversified art has been developed utilizing inorganic, metallic, or halogen fluorides or hydrogen fluoride in addition processes or in electrolytic cells where no free fluorine is produced.

Direct fluorination has sometimes been attempted on slurries containing the reactant compound in an inert liquid or solid diluent. For instance, see Wiezevich, U.S. Pat. No. 2,186,916 (1940) and Hoerger et al., U.S. Pat. No. 2,913,449 (1959). In most experiments, direct fluorination has previously produced low to mediocre yields which decrease as the molecular complexity becomes greater. In some reactions explosive proportions are reached and large quantities of the most stable saturated fluorides of the elements, such as $CF_4$ and HF, in the case of hydrocarbons are produced.

The direct fluorination of polyethylene with fluorine gas has been disclosed in Rudge, British Pat. No. 710,523 (1954), and Joffre, U.S. Pat. No. 2,811,468 (1957). In Siegart et al., U.S. Pat. No. 3,480,667 (1969), the use of fluorine gas in the presence of an alkali metal fluoride catalyst to fluorinate some aliphatic and aromatic hydrocarbons is disclosed.

Although processes for the direct fluorination of aliphatic and aromatic polymers, either as preferred objects or as powders, have been suggested by the prior art as noted above, none of the processes have achieved any substantial degree of commercial success. Most commercial fluorinated polymer products, such as polytetrafluoroethylene, are prepared by indirect means. This is so despite the fact that it is far easier to mold solid objects of various shapes from hydrocarbon polymers such as polyethylene than from fluorinated polymers such as polytetrafluoroethylene. Moreover, some polymers, such as polystyrene and phenol formaldehyde resins, have not even been fluorinated on a commercial scale, either by direct or indirect means.

The reaction products of direct fluorination processes contain in most, if not all cases, a number of easily hydrolyzable groups. Commercial fluorinated polymers, such as polytetrafluoroethylene, also contain some hydrolyzable groups, but not normally near as many as direct fluorination reaction products. These groups consist of either fluorine atoms or $CF_3$ groups on tertiary carbon atoms, i.e., carbon atoms attached to three other carbon atoms and either a fluorine atom or a $CF_3$ group. See Fieser and Fieser Introduction to Organic Chemistry, pp. 117–118 (1957); and Fumato, I., Sen-i Gakkaishi 21 (11), 590–7 (1965) (Japan). The replacement of the fluorine atoms or the $CF_3$ groups with hydroxyl groups, or even in some cases with oxygen atoms, when the fluorinated materials are in contact with basic solutions, certain organic solvents or even water for relatively long periods of time results in color degradation of the product, i.e., a brown color instead of a white color. Furthermore, fluorine ions may be released into and contaminate the solution causing the hydrolysis.

The color degradation of preformed or shaped objects, such as fluorinated polyethylene bottles or containers, is highly undesirable. Furthermore, if such containers or bottles contain materials which must be maintained in a high degree of purity, such as medicines and radioactive materials, the release of fluorine ions or $CF_3$ groups, even if in small amounts, may be sufficient to contaminate the contained materials.

Moreover, the thermal stability of such surface-fluorinated objects is limited. For example, surface fluorinated polyethylene may begin to deteriorate at 200–250° C., while commercial polytetrafluoroethylene, prepared by in-

3 direct means, is thermally stable and remains white at temperatures of 300° C. and higher.

SUMMARY OF THE INVENTION

The primary discovery of this invention is a method for the production of hydrolytically resistant fluorocarbons, having improved color and thermal stability, by the elimination of easily hydrolyzable groups from fluorinated aliphatic and aromatic hydrocarbons.

Another discovery of this invention is an improved fluorination process for enhancing the thermal and color stability of preformed objects made from polymeric aliphatic or aromatic hydrocarbon materials.

Other discoveries, objects and advantages of the present invention will appear in the following description, examples and claims.

The foregoing discoveries of this invention are achieved by treating fluorinated aliphatic or aromatic materials with a basic solution, such as sodium hydroxide, preferably at above 50° C., thereby replacing the fluorine atoms or $CF_3$ groups attached to tertiary carbon atoms with hydroxyl groups. The hydrolyzed material is then subjected to further direct fluorination by placing the material in an enclosed chamber; filling said enclosed chamber with an inert atmosphere; introducing fluorine gas or an inorganic fluoride gas such as $ClF_3$ or $BrF_3$ into the inert atmosphere at a very slow rate and continuing the flow of gas into said chamber at a slow rate such that the initial concentration of the fluorination gas is a mere trace and its concentration at such rate will be increased in the reaction chamber to not more than about 6% at the end of 30 minutes. The temperature of the reaction chamber should be maintained below about 100° C. and preferably below 30° C. until the desired degree of fluorination has been achieved. The use of 100° C. temperature is not desirable for most compounds because of the risk of uncontrolled fluorination, and in any event, the fluorination must be conducted below the decomposition temperature of the material being treated.

This invention has particular applicability to the treatment of surface-fluorinated preformed or shaped objects, such as bottles or containers, which would otherwise be subject to color degradation and possible contamination of the materials in contact with the containers or bottles. The contamination problem is of particular importance in the medical and nuclear fields. In addition, this invention results in enhanced thermal and chemical stability of fluorocarbon objects and materials.

The fluorinated materials treated in accordance with this invention can be initially fluorinated either by direct fluorination with fluorine gas as described above with respect to the refluorination of hydrolyzed fluorinated materials, or by some other direct or indirect means. The use of the direct fluorination technique in accordance with this invention has resulted in the production of new varieties of hydrolytically resistant perfluoro derivatives of polystyrene, polypropylene, and polyethylene.

BRIEF DESCRIPTION OF THE DRAWINGS

Turning now to the drawings, FIG. 1 is a flow diagram of the apparatus which may be used in the practice of the fluorination aspect of this invention, and FIG. 2 is a cross-section of the reaction chamber for fluorination of a bed of material.

DESCRIPTION OF PREFERRED EMBODIMENTS

Apparatus suitable for the practice of the fluorination aspect of this invention, either the refluorination of a hydrolyzed fluorinated material or the initial fluorination of an aliphatic or aromatic hydrocarbon material, is illustrated in FIG. 1, in which a suitable source of an inert gas, such as cylinder 10 containing helium gas is conducted to the reaction chamber through tubing lines 13 and 17. A flow meter 14 and needle valve 15 are provided in line 13. The gas flow from line 13 is conducted through line 17 and into packed tube 20. In the illustrated apparatus tubes 13 and 17 are one-quarter inch copper tubes and tube 20 is a one-half inch copper tube packed with copper filings. Gas passing through the packed tube 20 is conveyed into the reaction chamber 12 by line 22.

In the illustrated apparatus, reaction chamber 12 is an eighteen inch long, one inch I.D. nickel tube. A sample of a hydrolyzed fluorinated material to be further fluorinated is placed in the nickel boat 23 which is in turn placed in the reaction chamber 12. Gases from the reaction chamber are exhausted through line 25, passing through packed tube 27 containing a charge of granular alumina 28 to remove fluorine gas. The flow of gas from packed tube 27 is exhausted to the atmosphere through line 30.

High purity fluorine gas is supplied from any suitable source such as cylinder 32 containing fluorine gas under pressure which may be obtained from commercial sources at approximately 98% purity. The fluorine gas is conducted through line 34 to the needle control valve 35. The rate of flow of the fluorine gas is measured by conducting the gas through a suitable flow meter 36, such as a Hastings Mass Flow Meter, through line 38. The metered fluorine gas is conducted to the reaction chamber through line 39, line 17, mixer tube 20 and line 22.

An alternate reactor chamber 12a is illustrated in FIG. 2 in which a hydrolyzed fluorinated material is supported on a nickel wire cloth screen 43. As illustrated in FIG. 2 the hydrolyzed fluorinated material is shown as granular material 45. The reaction chamber may be of any suitable size; however, by way of illustration, a reaction chamber comprising a two inch I.D. tube with an eight inch bed space above screen 43 has been used in practicing the method of the present invention in a laboratory.

Turning now to the process of this invention, a fluorinated aliphatic or aromatic material is treated, in conventional apparatus not shown, with a basic solution, such as sodium hydroxide, preferably at a temperature above about 50° C. Although other base solutions can also be used in accordance with this invention, relatively strong solutions such as sodium, calcium or ammonium hydroxide are preferred. The weaker the solution the longer is the time needed to completely hydrolyze the fluorinated compound, i.e., replace fluorine atoms, or $CF_3$ groups with OH groups on the tertiary carbon atoms. After the fluorinated material has turned brown, it is then water washed to remove the base solution therefrom.

The hydrolyzed fluorinated compound after washing is then placed in reaction chamber 12 or 12a. The flow lines and the reaction chamber are then preferably purged by flowing an inert gas, such as helium gas, from cylinder 10 through the reaction chamber for a suitable period of time to substantially reduce the oxygen content of the atmosphere in the reaction chamber. It is presently preferred that the reaction chamber 12 be purged to avoid any oxygenation of the treated material; however, the fluorination process can be conducted in an air atmosphere if the presence of peroxy-species is not detrimental or high thermal stability is not crucial.

After purging the reaction chamber 12, if such procedure is followed, fluorine gas or other fluorination gas, is supplied form a suitable source such as high pressure gas cylinder 32. Flow of the fluorination gas is controlled by needle valve 35 and the rate of flow is measured by a flow meter suitable for use with a corrosive gas such as a Hastings Mass Flow Meter. The fluorination gas in conducted through a packed tube 20 which serves as a mixer for the fluorination gas and the air or inert gas in the system. The packed tube also serves as a mixer for any inert gas which may be used to dilute the fluorination gas.

Very low rates of flow are used in the practice of this invention. Within the limits set forth herein, the rate of flow of fluorination gas may be varied as desired, and it is sometimes desirable to start the fluorination process at a flow rate less than the upper limit specified, and after a few hours to increase it to approach the upper limits. In a laboratory-scale series of tests, a reaction chamber comprising a one inch I.D. nickel tube eighteen inches long was used with a flow rate of 3 cc. per minute of fluorinating gas. At this flow rate approximately 3% fluorinating gas is in the atmosphere of the reaction chamber at the end of thirty minutes; 7% at the end of one hour, and the total amount of fluorine gas at the end of five hours is only about 99%. In this apparatus, rates of flow may be used up to 6 cc. per minute, producing about 6% concention of fluorinating gas at the end of thirty minutes. When the large reaction chamber 12a is used, rates of flow of about 10 cc. per minute are used to obtain the same slow increase in concentration of fluorination gas to about 3% at the end of thirty minutes. For other reaction chambers of differing sizes the flow rate for the fluorination gas should be such that its concentration will not be more than 6%, preferably about 3%, at the end of thirty minutes, and not more than 14%, preferably about 7%, at the end of one hour of fluorination.

Inorganic fluoride gases, such as $ClF_3$ and $BrF_3$, can be use in the practice of the present invention and they have been shown to be effective reactants, but to a lesser extent than fluorine. In the case of $ClF_3$, the products may contain chlorine as well as fluorine.

When fluorination has proceeded from about 1 to about 16 hours, the fluorinating gas concentration which is initially a mere trace of the total atmospheric pressure in the reaction chamber gradually increases to one atmosphere on the fluorinated product. At the termination of the initial reaction period, the pressure may be raised above atmospheric for greater fluorine penetration and fluorination, or higher pressures may be used to obtain higher purity of the fluorocarbon products.

As previously noted, it is presently preferred that the air atmosphere in the reaction chamber be at least partially purged before fluorination is begun. Any inert gas is suitable for this purpose such as helium, neon, nitrogen or the like. To facilitate temperature control in the reaction chamber, the flow of fluorinating gas may be diluted for highly reactive substances by a constant flow of inert gas such as helium together with the fluorination gas during the first few hours of fluorination. The amount of dilution by inert gas is not critical and may be as little as 10% or less and as high as desired up to about 90%. Higher dilution rates are not often desirable because above 90% dilution the rate of increase in the fluorination gas concentration in the reaction chamber is too slow for practical fluorination. In general, it has been found that the effective control of the rate of fluorination can be achieved without dilution by maintaining a very low rate of flow of the fluorine gas.

When highly reactive materials are subjected to fluorination, it is important that the temperature of the reaction chamber be maintained below the temperature at which material will char or burn in the fluorine gas. For most materials, it has been found that the temperature should be maintained below 100° C. and preferably at room temperature (about 20° C.) or below. For laboratory-scale apparatus, the temperature of the reaction chamber can usually be maintained at about room temperature at the preferred rates of flow of fluorine gas as set forth herein, but it is within the contemplation of this invention to use cooling means such as cooling coils around or within the reaction chamber to maintain the temperature within these limits.

The static reaction step, as presently practiced, is accomplished after the fluorine concentration in the reaction chamber has reached about 100% by transferring the treated material to a pressure chamber or bomb and gradually raising the pressure to about 2 or 2½ atmospheres. The amount of increased pressure above atmospheric is not critical and higher pressures could be employed if desired for any reason such as, for example, to obtain deeper fluorination of the surface of solid objects.

The fluorinated materials that can be treated in accordance with this invention include powders, bottles, tubes, film, rods, filaments, woven cloth, sized cloth, coated paper, and the like. They can be initially fluorinated either by indirect or direct methods known to the prior art or by direct fluorination with fluorine gas, using the same procedure as outlined above with respect to further fluorination of hydrolyzed fluorinated materials. It has been found that regardless of the method of initial fluorination, hydrolytically sensitive sites cannot be completely eliminated. There will be in most, if not all cases, some fluorine atoms, or $CF_3$ groups attached to a tertiary carbon atom which are usually hydrolyzable in an alkaline or basic solution.

In the case of bottles and containers made of polyethylene, polypropylene and other similar materials, the use of the present invention can avoid the color degradation, from white to brown, of the bottles and containers resulting from contact with hydrolyzing materials, and at the same time prevent the contamination of materials in contact with these bottles and containers. In the medical and nuclear fields the introduction of traces of fluoride ions or $CF_3$ groups may possibly have deleterious effects. Moreover, the thermal stability of the fluorinated surfaces of the bottles and containers are greatly enhanced by the use of the present invention.

Another aspect of this invention involves the initial fluorination of aliphatic and aromatic hydrocarbons with fluorine gas. The same procedure as outline hereinabove with respect to the further fluorination of hydrolyzed fluorinated materials is used. By controlling the flow rate of the fluorine gas and therefore the concentration of the gas in the reaction chamber, uncontrolled reactions between fluorine and hydrocarbon materials, and consequently burning or charring of the hydrocarbon materials, are avoided. No metal heat sink is needed to dissipate the heat of reaction and no special shape or form of the hydrocarbon material is required. Yields approaching 100% can be obtained without the use of any catalyst.

New varieties of hydrolytically resistant perfluoro derivatives of aliphatic and aromatic polymers have been produced by using the direct fluorination technique of this invention. For example, new varieties of polytetrafluoroethylene differing in molecular weight and extent of branching from commercial polytetrafluoroethylene (prepared by polymerization of $C_2F_4$-monomer) can be produced. Although the fact that commercial polytetrafluoroethylene exists only in a fairly narrow molecular weight range and as a long-chain polymer with little cross-linking is advantageous for some purposes, these properties preclude certain other applications and limits the usefulness of the material. In contrast, the direct fluorination of various types of polyethylene, followed by hydrolysis and refluorination, results in a series of perfluoro polymers exhibiting a wide range of melting temperatures and thermal stability, which leads to better solubilities and improved adherence to substrates.

The fluorination of ordinary waxed paper yields a fluorocarbon coating which is less flammable and more solvent resistant than the original paraffin wax coating. Such a fluorocarbon coating is essentially transparent when thin and could be used to provide a protective film over maps, diagrams, labels or other paper items requiring protection from an oxidizing enxironment, from chemical solvents and from elevated temperatures. Thin films of polyethylene, polypropylene and polystyrene can also be fluorinated by this technique to give transparent films with fluorocarbon surface properties.

By way of further illustration of the invention but without limiting the scope thereof, the following specific examples demonstrate the practice of the invention with apparatus illustrated in FIGS. 1 and 2.

EXAMPLE 1

A polyethylene bottle was placed in the reactor 12 and fluorinated with a flow of 4 cc. per minute fluorine at room temperature and atmospheric pressure for eight hours. It was then removed from the reactor and placed in the bomb containing fluorine at one atmosphere and the pressure was gradually raised to 25 pounds per inch. The bottle was then found to be coated with a skin of polytetrafluoroethylene to a depth of approximately 0.2 mm. The fluorinated polyethylene bottle was then treated with 1 N sodium hydroxide solution at 80° C. for one hour. The bottle had turned brown. After washing with water to remove the sodium hydroxide solution, the brown bottle was then refluorinated at 3 cc. per minute of fluorine for two days. The bottle again turned white and had an adherent fluorocarbon surface film.

EXAMPLE 2

One gram of polypropylene was fluorinated in the nickel boat within reaction chamber 12 at a fluorine flow of 4 cc. per minute for 10 hours yielding approximately 3.5 grams of perfluoropolypropylene. This latter material was then treated with 1 N sodium hydroxide solution at 80° C. for one hour, producing a brown powder. After washing with water and filtering, the brown powder was refluorinated as in Example 1 to again produce a white powder.

EXAMPLE 3

Polystyrene was fluorinated for 8 hours at 4 cc. per minute fluorine flow producing a white fluffy powder. This powder was then treated with 1 N sodium hydroxide solution at 80° C. for 1 hour. The brown powder so produced was then washed with water and filtered from the sodium hydroxide solution. It was then refluorinated as in Example 1 and a white powder resulted.

EXAMPLE 4

Polypropylene cloth was fluorinated at 4 cc. per minute fluorine for 8 hours producing a cloth which was unchanged in appearance. The cloth was then treated with 1 N sodium hydroxide solution at 80° C. for one hour. The resulting brown cloth was then washed with water to remove the sodium hydroxide solution before refluorination at a fluorine flow rate of 3 cc. per minute for two days. A white cloth resulted.

In the treatment of aliphatic and aromatic hydrocarbons in accordance with this invention, tests of the fluorinated products by infra-red spectra, fluorine and proton NMR spectra, mass spectrometric studies and quantitative analyses indicate above 98% conversion to saturated fluorocarbons.

It would be obvious to persons skilled in the art that minor variations in the procedures of this invention may be used to produce partially or fully fluorinated products in addition to those specifically set forth herein and that changes and modifications of the invention can be made. Insofar as such variations and modifications incorporate the true spirit of this invention, they are intended to be included within the scope of the appended claims.

We claim:

1. A process for the production of hydrolytically resistant fluorocarbon surfaces on hydrocarbon substrates from solid polymeric surface-fluorinated hydrocarbon materials comprising the steps of: (a) hydrolyzing the fluorinated hydrocarbon material with a basic solution at a temperature above about 50° C. until discoloration appears; (b) washing the hydrolyzed hydrocarbon material with water to remove the base solution; and (c) refluorinating the washed hydrolyzed material by contacting said material in an enclosed chamber with fluorinating gas selected from the group consisting of fluorine and inorganic fluorides, said gas being introduced into the atmosphere surrounding said material at a rate not more than the rate resulting in 6% concentration in said atmosphere at the end of 30 minutes after fluorination has begun, said reaction chamber being maintained below the decomposition temperature of said material throughout said fluorination.

2. The process of claim 1 including the step of purging said reaction chamber with an inert gas to remove a substantial portion of the oxygen therein before contacting said washed hydrolyzed material with said fluorinating gas.

3. The process of claim 1 in which the basic solution is a material selected from the group consisting of sodium hydroxide, calcium hydroxide and ammonium hydroxide.

4. The process of claim 3 in which said fluorinated hydrocarbon material is hydrolyzed with the basic solution at a temperature between about 70° C. and about 90° C.

5. The process of claim 1 in which said fluorinating gas introduced into said chamber is diluted with an inert gas in a ratio from about 10% to about 90% inert gas during the initial introduction of fluorinating gas into said chamber, and the concentration of fluorinating gas introduced into said chamber is gradually increased during the reaction period until about 100% fluorine gas is introduced.

6. The process of claim 1 in which said fluorinating gas is fluorine.

7. The process of claim 6 in which said fluorinating gas is introduced into said atmosphere at a rate such that the concentration of fluorinating gas at the end of 30 minutes is not more than 3%.

8. The process of claim 7 in which said basic solution is sodium hydroxide.

9. The process of claim 1 in which the temperature of said chamber is maintained below 100° C. by controlling the rate of flow of fluorinating gas into the chamber.

10. The process of claim 7 in which said fluorinated hydrocarbon material is a solid fluorinated aliphatic material.

11. The process of claim 10 in which said solid fluorinated aliphatic material is a molded polymeric object.

12. The process of claim 1 in which said fluorinated hydrocarbon material is a solid fluorinated polymeric aromatic material.

13. The process of claim 1 in which said fluorinated hydrocarbon material is a material selected from the group consisting of fluorinated polyethylene, polypropylene and polystyrene and said fluorinating gas is fluorine.

14. The process of claim 13 in which said material is a fluorinated polyethylene molded object.

15. A process for the production of hydrolytically resistant fluorocarbon surfaces on hydrocarbon substrates from a solid polymeric hydrocarbon material selected from the group consisting of aliphatic and aromatic hydrocarbons comprising the steps of:

(a) Placing said hydrocarbon material in an enclosed chamber;
(b) Contacting said material with a fluorinating gas selected from the group consisting of fluorine and inorganic fluorides, said gas being introduced into the atmosphere surrounding said material at a rate not more than the rate resulting in 6% concentration in said atmosphere at the end of 30 minutes after fluorination has begun, said reaction chamber being maintained below the decomposition temperature of said material throughout said fluorination;
(c) Hydrolyzing the fluorinated material from step (b) with a basic solution at a temperature above about 50° C. until discoloration appears;
(d) Washing the hydrolyzed material from step (c) with water to remove the basic solution; and
(e) Refluorinating the washed hydrolyzed material from step (d) by contacting said material in an enclosed chamber with a fluorinating gas selected from the group consisting of fluorine and inorganic fluorides, said gas being introduced into the atmosphere surrounding said material at a rate not more than the rate resulting in 6% concentration in said atmosphere at the end of 30 minutes after fluorination has begun, said reaction chamber being maintained below the decomposition temperature of said material throughout said fluorination.

16. The process of claim 15 wherein the basic solution is a material selected from the group consisting of sodium hydroxide, calcium hydroxide and ammonium hydroxide.

17. The process of claim 16 wherein said fluorinated material is hydrolyzed in step (c) at a temperature between about 70° C. and about 90° C.

18. The process of claim 15 in which said fluorinating gas is fluorine.

19. The process of claim 18 including the steps of purging said reaction chamber with an inert gas to remove a substantial portion of the oxygen therein before contacting said material in steps (b) and (e) with said fluorine gas.

20. The process of claim 19 in which said fluorinating gas introduced into said chamber is diluted with an inert gas in a ratio from about 10% to about 90% inert gas during the initial introduction of fluorine gas into said chamber, and the concentration of fluorine gas introduced into said chamber is gradually increased during the reaction period until about 100% fluorine gas is introduced.

21. The process of claim 15 in which said hydrocarbon material is a solid aliphatic hydrocarbon material, and said fluorinating gas is fluorine.

22. The process of claim 21 in which said solid aliphatic hydrocarbon material is a molded polyethylene object.

23. The process of claim 21 in which said solid aliphatic hydrocarbon material is polypropylene fibers.

24. The process of claim 15 in which said hydrocarbon material is a polymeric aromatic material.

25. The process of claim 15 in which said hydrocarbon material is a material selected from the group consisting of polyethylene, polypropylene and polystyrene and said fluorinating gas is fluorine.

References Cited

UNITED STATES PATENTS

| | | | |
|---|---|---|---|
| 2,811,468 | 10/1957 | Joffre | 260—94.9 H |
| 2,711,972 | 6/1955 | Miller et al. | 260—92.1 S |
| 3,129,289 | 9/1938 | Sall | 260—94.7 HA |
| 2,497,046 | 2/1950 | Kropa | 260—92.1 S |

FOREIGN PATENTS

| | | |
|---|---|---|
| 1,210,794 | 10/1970 | Great Britain. |
| 645,591 | 7/1962 | Canada. |

OTHER REFERENCES

Fumoto: Chem. Abstracts, vol. 64, col. 11365h-11366a (1966).

Banks: Fluorocarbons and Their Derivative, Oldbourne Book Co., Ltd. London (1964), pp. 13–16, 136, 137, 140.

JOSEPH L. SCHOFER, Primary Examiner

E. J. SMITH, Assistant Examiner

U.S. Cl. X.R.

260—93.1, 93.5 A, 93.7, 94.9 GD

UNITED STATES PATENT OFFICE
CERTIFICATE OF CORRECTION

Patent No. 3,758,450     Dated September 11, 1973

Inventor(s) John L. Margrave, and Richard J. Lagow

It is certified that error appears in the above-identified patent and that said Letters Patent are hereby corrected as shown below:

Col. 1, line 60, "fluoroinated" should be -- fluorinated --

Col. 2, line 27, "prefermed" should be -- preformed --

Col. 3, line 72, "helimum" should be -- helium --

Col. 4, line 62, "form" should be -- from --

Col. 5, line 11, "concention" should be -- concentration --

Col. 5, line 13, "large" should be -- larger --

Col. 5, line 23, "use" should be -- used --

Col. 6, line 33, "outline" should be -- outlined --

Col. 6, line 55, "limits" should be -- limit --

Col. 6, line 69, "enxironment" should be -- environment --

Signed and sealed this 26th day of February 1974.

(SEAL)
Attest:

EDWARD M. FLETCHER, JR.
Attesting Officer

C. MARSHALL DANN
Commissioner of Patents